(12) United States Patent
Ito et al.

(10) Patent No.: US 8,265,123 B2
(45) Date of Patent: Sep. 11, 2012

(54) CDMA RECEIVING APPARATUS AND CDMA RECEIVING METHOD

(75) Inventors: Akira Ito, Kawasaki (JP); Masahiko Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 833 days.

(21) Appl. No.: 12/239,974

(22) Filed: Sep. 29, 2008

(65) Prior Publication Data

US 2009/0022212 A1 Jan. 22, 2009

Related U.S. Application Data

(63) Continuation of application No. PCT/JP2006/306897, filed on Mar. 31, 2006.

(51) Int. Cl.
*H04B 1/00* (2006.01)

(52) U.S. Cl. ........ 375/150; 375/147; 375/148; 375/149; 375/152; 375/260; 375/296; 375/335; 375/342; 375/355

(58) Field of Classification Search .................. 375/150, 375/147, 148, 149, 152, 260, 296, 335, 342; 375/355; 370/342
See application file for complete search history.

(56) References Cited

U.S. PATENT DOCUMENTS

| | | | |
|---|---|---|---|
| 5,761,211 A | 6/1998 | Yamaguchi et al. | |
| 5,982,763 A | 11/1999 | Sato | |
| 6,154,487 A | 11/2000 | Murai et al. | |
| 6,816,542 B1 | 11/2004 | Komatsu | |
| 7,042,862 B1 * | 5/2006 | Hirade | 370/335 |
| 7,254,185 B2 * | 8/2007 | Chiu et al. | 375/316 |
| 7,295,815 B1 * | 11/2007 | Wright et al. | 455/91 |
| 2002/0141482 A1 * | 10/2002 | Agami et al. | 375/147 |
| 2003/0123408 A1 * | 7/2003 | Saitou | 370/335 |
| 2003/0231703 A1 * | 12/2003 | Lugil | 375/148 |
| 2004/0120387 A1 * | 6/2004 | Bultan et al. | 375/149 |

FOREIGN PATENT DOCUMENTS

| | | |
|---|---|---|
| EP | 0 977 369 A2 | 2/2000 |
| EP | 0 977 369 A3 | 11/2001 |
| JP | 9-64857 | 3/1997 |
| JP | 10-32523 | 2/1998 |
| JP | 11-41141 | 2/1999 |
| JP | 2000-244367 A | 9/2000 |
| JP | 2001-16136 | 1/2001 |
| JP | 3322246 B | 6/2002 |
| JP | 2003-198427 A | 7/2003 |
| JP | 3443113 B | 6/2005 |
| WO | WO01/06673 * | 1/2001 |

OTHER PUBLICATIONS

International Search Report dated Jun. 14, 2006 for corresponding International Application No. PCT/JP2006/306897.

(Continued)

*Primary Examiner* — Dhaval Patel
(74) *Attorney, Agent, or Firm* — Myers Wolin LLC

(57) ABSTRACT

A CDMA receiving apparatus includes a path searcher which outputs path timing that corresponds to sample timing where a correlation value between a received data sequence and a reference code sequence reaches a peak, and outputs the correlation value calculated at a sample timing adjacent to the path timing as an adjacent timing correlation value; an interpolation adjuster; and a despreader which despreads an output of the interpolation adjuster at the path timing, wherein the interpolation adjuster includes an interpolator for generating an interpolating data sequence which is a data sequence displaced in time by a specified fraction of one sample period with respect to the received data sequence, and outputs the received data sequence or the interpolating data sequence by switching therebetween based on a result of a comparison between the correlation value calculated at the path timing and the adjacent timing correlation value.

12 Claims, 16 Drawing Sheets

OTHER PUBLICATIONS

Japanese Patent Office "Notice of Reasons for Rejection" for corresponding Japanese Patent Application No. 2008-509639, mailed Aug. 24, 2010. English translation attached.

European Patent Office, Supplemental European Search Report with Annex and Written Opinion, issued for corresponding European Patent Application No. 06730845.2, dated May 4, 2011.

* cited by examiner

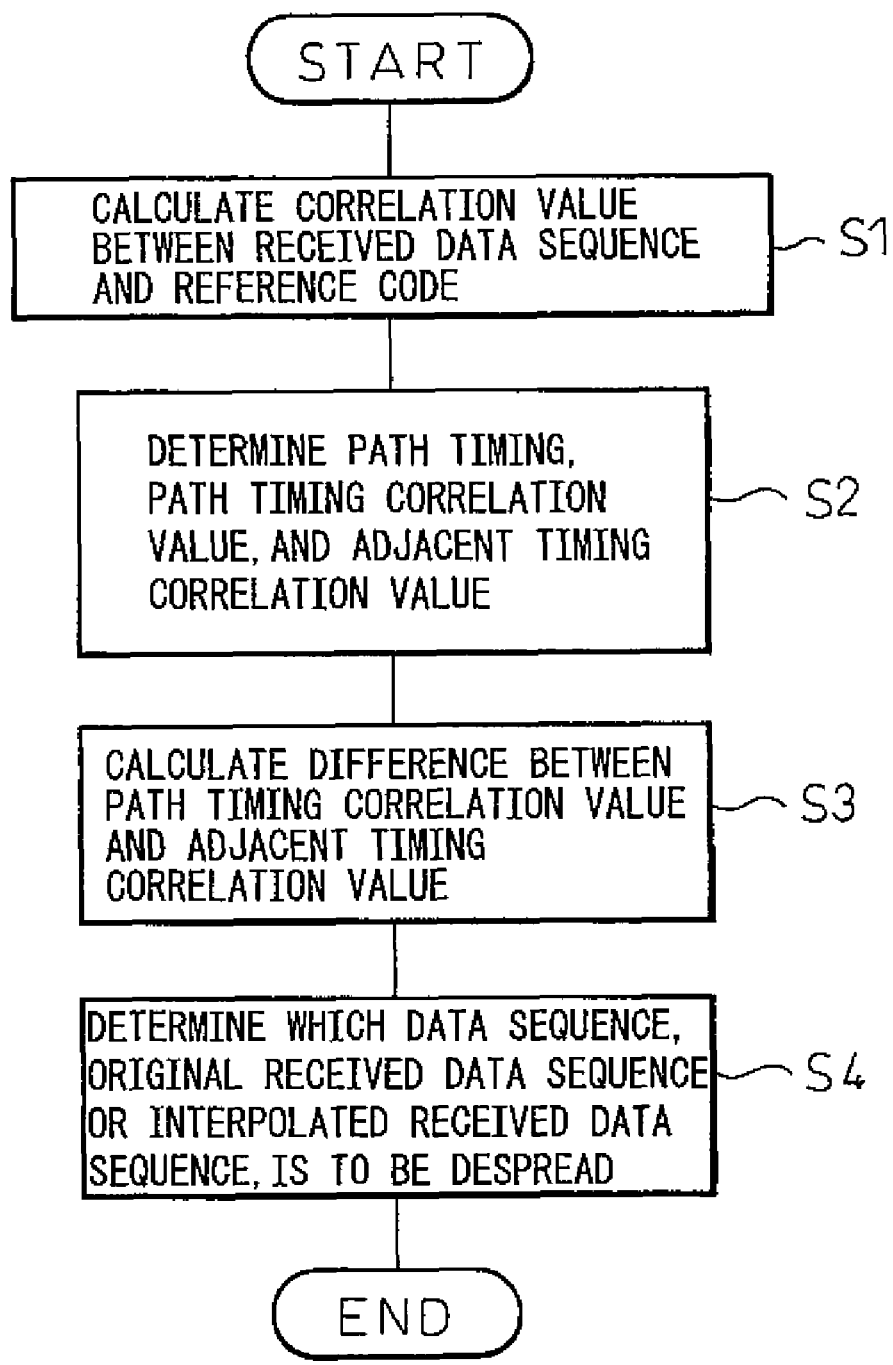

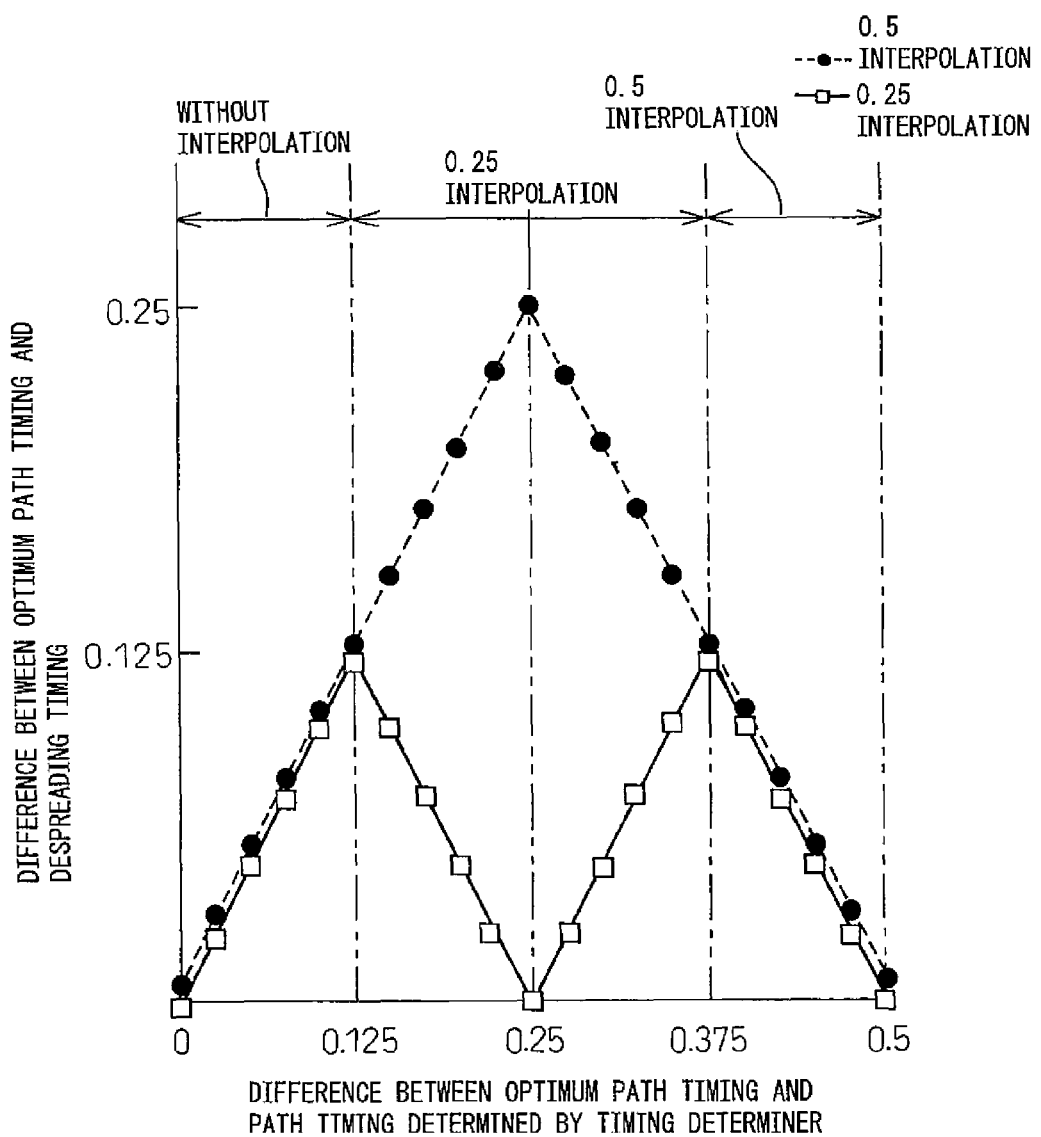

CDMA RECEIVING APPARATUS AND CDMA RECEIVING METHOD

CROSS REFERENCE TO RELATED APPLICATION

The present application is a continuation application based on International application No. PCT/JP2006/306897, filed on Mar. 31, 2006.

BACKGROUND

1. Field

The present invention relates to a CDMA receiving apparatus and CDMA receiving method, for use in a CDMA communication system, that receive a signal generated by spreading a transmitted data sequence with a spreading code sequence, and after converting the received signal into a received data sequence as a digital signal at a prescribed sampling speed, despread the received signal by using the same code sequence as the spreading code sequence and demodulate the received signal. More specifically, the invention relates to techniques for optimizing the despreading timing for despreading the received data sequence in such a CDMA receiving apparatus and CDMA receiving method.

2. Description of the Related Art

Recent mobile radio communication systems employ direct-sequence code division multiple access (DS-CDMA) techniques whereby if the receiving electric field strength in a given frequency band drops, intended information can be recovered from another frequency band.

FIG. 1 is a block diagram schematically showing the configuration of a prior art CDMA receiver disclosed in patent document 1.

A high-frequency signal of a ratio frequency received by an antenna 11 is converted in a radio receiver 12 into a baseband signal of an intermediate frequency. The baseband signal is quadrature-detected by a quadrature detector 13 which thus outputs in-phase component (I-channel component) data and quadrature component (Q-channel component) data. The output signal of the quadrature detector 13 is band-limited by a low-pass filter (LPF) 14, and the I-channel component signal and the Q-channel component signal are each sampled at a predetermined sampling frequency, for example, chip rate, and converted into a received data sequence of digital form by an AD converter (ADC) 15. The received data sequence is then oversampled, as needed, and supplied to a path searcher 20 as well as to fingers 30a to 30d.

Unless specifically stated otherwise, the terms "sampling speed," "sampling frequency," and "sampling period" used in the following description refer to the sampling speed, sampling frequency, and sampling period, respectively, of the received data sequence supplied to the path searcher 20.

The path searcher 20 includes a reference code sequence generator 21 which generates as a reference code sequence the spreading code assigned to the receiving apparatus 1, a correlation calculator 22 which calculates a correlation value indicative of correlation between the incoming received data sequence and the reference code sequence at a given timing, a power calculator 23 which calculates a correlation power value or the absolute value of the correlation value, and a timing determiner 24 which determines path timing for each path on a multipath channel. This path timing is used to determine the despreading timing for a despreader 31 in each of the fingers 30a to 30d, to be described later, to multiply the received data sequence with a despreading code for the despreading of the received data sequence.

Letting In (n=1, 2, ...) denote the reference code sequence of the I-channel component, Qn denote the reference code sequence of the Q-channel component, a(tn) denote the received data sequence of the I-channel component output from the AD converter 15, and b(tn) denote the received data sequence of the Q-channel component output from the AD converter 15, the correlation calculator 22 calculates the correlation value for each sampling period in accordance with the following equation (1).

[Mathematical 1]

$$\Sigma_n \{a(tn) \cdot \text{In} + jb(tn) \cdot Qn\}(n=1,2,\ldots) \quad (1)$$

Likewise, the power calculator 23 calculates the correlation power value for each sampling period in accordance with the following equation (2).

[Mathematical 2]

$$\Sigma_n \{[a(tn) \cdot \text{In}]^2 + [b(tn) \cdot Qn]^2\}(n=1,2,\ldots) \quad (2)$$

The correlation calculator 22 can be realized by a matched filter MF shown in FIG. 2. In the matched filter MF, the received data sequence output from the AD converter is sequentially shifted through a shift register SFR (S0 to Sn) at the sampling frequency, while on the other hand, the reference code is held in a reference code register RSF (C0 to Cn).

The received data sequence sequentially shifted through the shift register SFR (S0 to Sn) is multiplied by multipliers (M0 to Mn) with the corresponding data in the reference code sequence held in the reference code register RSF (C0 to Cn), and the outputs of the respective multipliers (M0 to Mn) are added together by an adder A for output.

According to this matched filter MF, the correlation value between the received data sequence and the reference code sequence at a given timing can be calculated for each sampling period, and the correlation value between the received data sequence shifted in phase by one sampling period and the reference code sequence can be calculated at the next sampling time period. In this manner, all the correlation values are calculated by sequentially shifting the phase by one sampling period during one bit period of the transmitted data. According to this matched filter MF, the correlation value becomes large when the phase of the received data sequence matches that of the reference code sequence.

When a multipath direct sequence signal (DS signal) is input to the path search 20, the correlation value becomes large at the timing that matches the delay time (phase delay) of each path, and the correlation power value having a peak value proportional to the receiving electric field strength of the path is output from the power calculator 23 and supplied to the timing determiner 24.

The timing determiner 24 that received the correlation power value detects a peak value larger than a predetermined threshold value, determines for each path on the multipath channel the despreading timing at which to multiply the received data sequence with the despreading code sequence, and supplies the thus determined timing to a corresponding one of the fingers 30a to 30d.

The fingers 30a to 30d for the respective paths are identical in configuration.

The despreader circuit 31 despreads the received code sequence input from the AD converter 15, by multiplying it with a received-data demodulating despreading code sequence at the path timing specified by the path searcher 20. A synchronous detector 32 removes the effects of fading from the detected signal by performing channel estimation. The signals detected at the respective fingers 30a to 30d are combined by a RAKE receiver 16.

Patent document 1: Japanese Unexamined Patent Publication No. 2003-198427
Patent document 2: Japanese Unexamined Patent Publication No. 2000-244367
Patent document 3: Japanese Patent No. 3322246
Patent document 4: Japanese Patent No. 3443113

As described above, the path searcher 20 detects the path timing for applying despreading. Each timing detected by the path searcher 20 represents one of discrete times corresponding to the sampling times of the received data sequence, and contains a timing error relative to the correct path timing of the incoming received signal. This timing error can become as large as one half of the sampling period.

Normally, i.e., in the presence of interference such as multipath interference or radio interference from other cells, the amount of degradation due to this timing error is not much of a problem, but in an area where reception quality is good and a high-speed data transmission can be achieved, the timing error becomes noticeable.

For example, in a case where the AD converter 15 performs the analog-to-digital conversion by oversampling the received data sequence at a rate four times the chip rate in an environment where the CQI value used in HSDPA (High Speed Downlink Packet Access) standard to measure the reception quality (SIR measurement) is about 30 which indicates the highest reception quality; in this case, if the path timing detected by the path searcher 20 is displaced from the correct path timing by one half of the sampling period, a difference of 5 dB or greater will occur compared with the case where the detected path timing coincides with the correct timing.

One possible method to minimize the timing error between the path timing detected by the path searcher 20 and the correct path timing would be to increase the oversampling rate of the received data sequence. However, since increasing the sampling speed involves increasing the amount of circuitry and greatly affects the product design, it is considered that in the current W-CDMA system, four times the chip rate is the limit.

Another possible method to minimize the timing error would be to allow the path timing by the path searcher 20 to follow the change in analog fashion by using a delay locked loop (DLL), but this would increase the complexity of the system. A technique that increases the sample rate of the AD converter 15 could be employed, but this would greatly increase the cost and power consumption.

In view of the above problems, it is an object of the apparatus and method disclosed herein to reduce, using a simple configuration, the timing error between the discrete path timing detected by the path searcher 20 and the optimum path timing determined in accordance with the actual receive time.

SUMMARY

The present inventors have noted the fact that when the optimum path timing lies between discrete sampling timings, the difference decreases between the correlation value at the path timing where the correlation value between the received data sequence and the reference code sequence becomes maximum and the correlation value at a sampling timing adjacent to the path timing, but that when the optimum path timing is close to the sample timing, the difference between the correlation values increases.

In view of this, in the present invention, in addition to the correlation value at the path timing, the correlation value at its adjacent sampling timing is calculated and, based on the result of a comparison between these correlation values, it is determined whether the optimum path timing lies between the sample timings; then, if the optimum path timing lies between the sample timings, despreading is applied to a data sequence generated by interpolating the received data sequence.

In other words, a CDMA receiving apparatus according to a first mode of the embodiment is a CDMA receiving apparatus for demodulating a received signal by applying despreading thereto using a code sequence identical to a spreading code sequence, comprising: a path searcher which takes a received data sequence as an input, and which outputs path timing that corresponds to sample timing where a correlation value indicative of correlation between the received data sequence and a reference code sequence reaches a peak, and outputs the correlation value calculated at a sample timing adjacent to the path timing as an adjacent timing correlation value; an interpolation adjuster; and a despreader which despreads an output of the interpolation adjuster at the path timing. The interpolation adjuster includes an interpolator for generating an interpolated received data sequence displaced in time by a specified fraction of one sample period with respect to the received data sequence, and the interpolation adjuster outputs the received data sequence or the interpolated received data sequence by switching therebetween based on a result of a comparison between the correlation value calculated at the path timing and the adjacent timing correlation value.

A CDMA receiving method according to a second mode of the embodiment is a CDMA receiving method for demodulating a received signal by applying despreading thereto using a code sequence identical to a spreading code sequence, comprising: a path search step for taking a received data sequence as an input, and for outputting path timing that corresponds to sample timing where a correlation value indicative of correlation between the received data sequence and a reference code sequence reaches a peak, and outputting the correlation value calculated at a sample timing adjacent to the path timing as an adjacent timing correlation value; an interpolation adjusting step for generating an interpolated received data sequence displaced in time by a specified fraction of one sample period with respect to the received data sequence, and for outputting the received data sequence or the interpolated received data sequence by switching therebetween based on a result of a comparison between the correlation value calculated at the path timing and the adjacent timing correlation value; and a despreading step for despreading at the path timing the data sequence selected and output by the interpolation adjusting step.

BRIEF DESCRIPTION OF THE DRAWINGS

FIG. 4 is a flowchart explaining a CDMA receiving method disclosed herein.

FIG. 12 is a diagram (part 1) showing the difference between despreading timing and optimum path timing in the CDMA receiving apparatus shown in FIG. 6.

DESCRIPTION OF THE PREFERRED EMBODIMENTS

Figure 3:
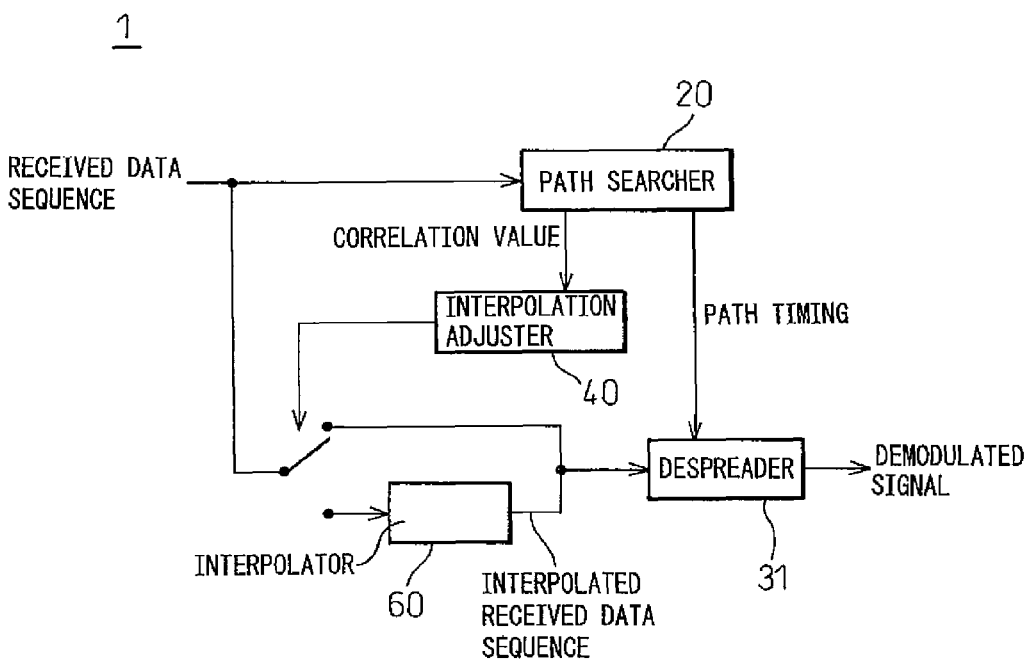
FIG. 3 is a block diagram showing the basic configuration of a CDMA receiving apparatus disclosed herein.
Figure 5A:
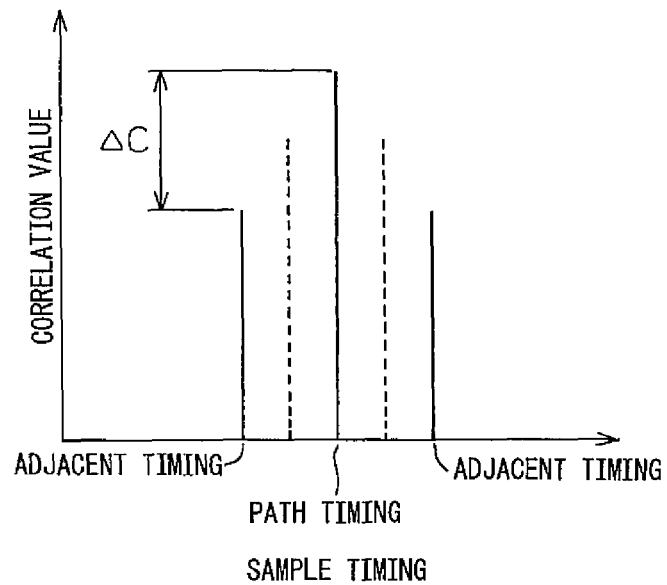
FIG. 5A is diagrams (part 1) explaining the CDMA receiving method disclosed herein.
Figure 5B:
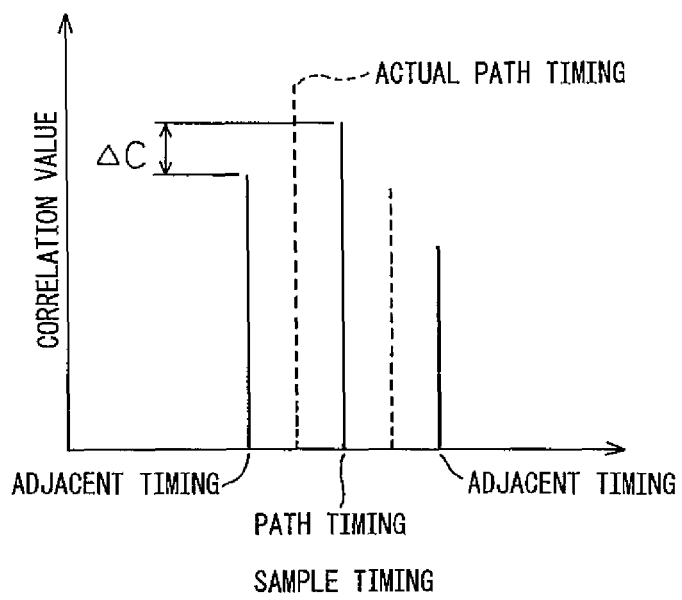
FIG. 5B is a diagram (part 2) explaining the CDMA receiving method disclosed herein.

Before describing the preferred embodiments, the basic principles of the apparatus and method disclosed herein will be described below. FIG. 3 is a block diagram showing the basic configuration of a CDMA receiving apparatus disclosed herein, FIG. 4 is a flowchart for explaining a CDMA receiving method disclosed herein, and FIGS. 5A and 5B are diagrams for explaining the CDMA receiving method disclosed herein.

As shown in FIG. 3, the CDMA receiving apparatus 1 includes: a path searcher 20 which calculates a correlation value indicative of correlation between a received data sequence, i.e., a digital data sequence of received signals, and a reference code sequence corresponding to the earlier described spreading code sequence (alternatively, a correlation power value may be calculated—the same applies hereinafter) and determines path timing that corresponds to sample timing where the correlation value reaches a peak as the despreading timing of the received data sequence; and a despreader circuit 31 which performs the despreading by multiplying the received code sequence with a received-data demodulating despreading code sequence at the path timing specified by the path searcher 20.

The data sequence generated by digital-to-analog converting the received signal with a predetermined sampling rate at the preceding stage may be directly taken as the received data, or this data sequence may be oversampled and the thus oversampled data sequence may be taken as the received data. Further, the received signal used for the path search may be a CPICH (common pilot) signal as in the prior art.

The correlation value at the path timing supplied to the despreader circuit 31 (the path timing correlation value) and the correlation value at a timing adjacent to the path timing (the adjacent timing correlation value) are calculated by the path searcher 20 and supplied to an interpolation adjuster 40 (steps S1 and S2 in FIG. 4). The timing adjacent to the path timing, for example, when the path timing is for the n-th sample, may be the (n−1)th timing one sample back and/or the (n+1)th timing one sample later.

Further, the correlation value (and the power correlation value) at the timing adjacent to the path timing may be calculated by shifting the combination of the sample from the received data sequence and the sample from the reference code sequence, multiplied together when calculating the correlation value at the path timing, forward and/or backward by one sample and by multiplying the thus shifted samples together.

For example, when the received data sequence is represented by a sequence of samples $\{S(t): t = \ldots, -1, 0, 1, 2, \ldots i-1, 1, \ldots\}$, and the reference code sequence by $\{C0, C1, C2, \ldots, Cn-1, Cn\}$, if the correlation value CL(0) calculated by the following equation (3) has a peak larger than a predetermined threshold value, it is determined that the sample t=0 gives the path timing.

[Mathematical 3]

$$CL(0) = \Sigma_n \{S(n) \times C(n)\} \quad (n=0,1,2,\ldots) \tag{3}$$

In this case, the correlation values CL(−1) and CL(1) at the adjacent timings one sample back and one sample later, respectively, relative to the path timing, are calculated by the following equations (4) and (5).

[Mathematical 4]

$$CL(-1) = \Sigma_n \{S(n-1) \times C(n)\} \quad (n=0,1,2,\ldots) \tag{4}$$

$$CL(1) = \Sigma_n \{S(n+1) \times C(n)\} \quad (n=0,1,2,\ldots) \tag{5}$$

The interpolation adjuster 40 calculates the difference between the path timing correlation value and the adjacent timing correlation value supplied from the path searcher 20 (step S3 in FIG. 4). At this time, if the path timing correlation value is sufficiently large, and its difference relative to the adjacent timing correlation value is large, as shown in FIG. 5A, it is presumed that the path timing detected by the path searcher 20 is sufficiently close to the actual path timing.

Conversely, if the path timing correlation value is small, and its difference relative to the adjacent timing correlation value is therefore small, as shown in FIG. 5B, it is presumed that the actual path timing lies between the sample timings.

In connection with this, the CDMA receiving apparatus 1 includes an interpolator 60 that generates an interpolated received data sequence which is a data sequence of values interpolated between the sampling timings of the received data sequence. The interpolator 60 can be realized by a digital filter (interpolation filter). Then, based on the result of the comparison between the path timing correlation value and the adjacent timing correlation value, the interpolation adjuster 40 determines to which data sequence, the original received data sequence or the interpolated received data sequence interpolating it, the despreading is to be applied, and supplies the selected data sequence to the despreader 31 (step S4 in FIG. 4).

In the configuration of FIG. 3, if for example, the difference between the path timing correlation value and the adjacent timing correlation value or their ratio (path timing correlation value/adjacent timing correlation value) is not smaller than a predetermined threshold value, the interpolation adjuster 40 determines that no interpolation is needed, and supplies the original received data sequence to the despreader 31. On the other hand, if the difference or the ratio is smaller than the predetermined threshold value, it is determined that the actual path timing lies between the sample timings, and the interpolated received data sequence output from the interpolator 60 is supplied to the despreader 31.

The selection of which interpolated received data sequence, the one advanced by a fraction of one sampling period with respect to the original received data sequence or the one delayed by a fraction of one sampling interval, is to be input to the despreader 31, i.e., the selection of which interpolated value, the one between the original path timing detected by the path searcher 20 and the adjacent timing one sample back or the one between the original path timing and the adjacent timing one sample later, is to be taken as the new path timing, may be made based on which of the timing correlation values at the adjacent timings back and later is closer to the correlation value at the path timing.

According to the CDMA receiving apparatus and CDMA receiving method described above, when the actual path timing lies between the sample timings at which the received signal was sampled, since the despreading is applied to the data sequence interpolated between the sample timings, the timing error relative to the correct path timing can be reduced, that occurs when despreading the received data sequence generated by sampling the received signal at discrete sample timings.

Embodiments will be described below with reference to the accompanying drawings.

Figure 1:
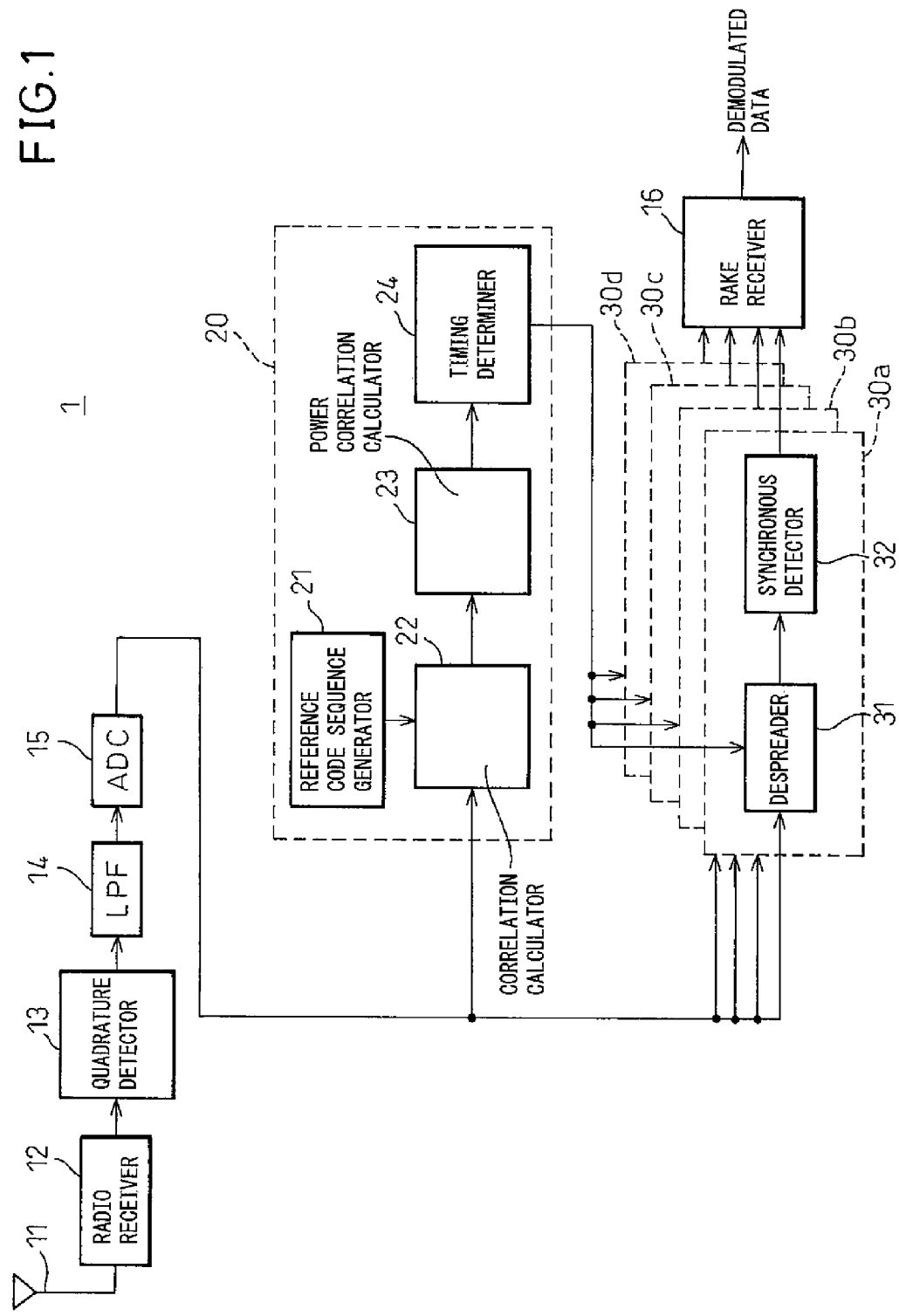
FIG. 1 is a block diagram schematically showing the configuration of a prior art CDMA receiver.
Figure 6:
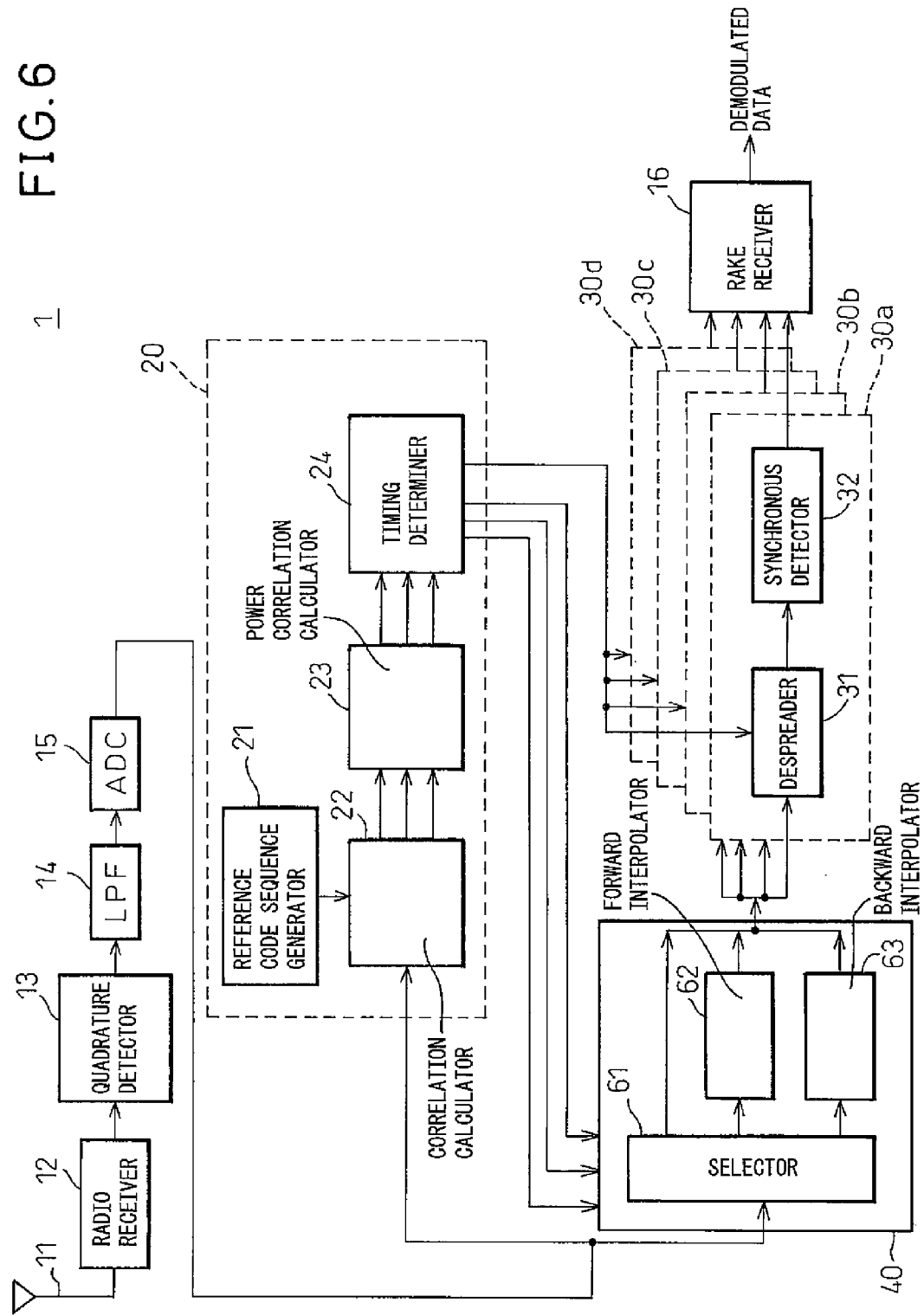
FIG. 6 is a block diagram showing a CDMA receiving apparatus according to a first embodiment.

FIG. 6 is a block diagram showing a CDMA receiving apparatus according to a first embodiment. The same component elements as those in the prior art CDMA receiving apparatus shown in FIG. 1 are designated by the same reference numerals. The description of the same functions will not be repeated here.

In this embodiment, the correlation calculator 22 calculates not only the correlation value between the received data sequence and the reference code sequence at each sample timing in the prior art, but it also the correlation value at the timing one sample back and the correlation value at the timing one sample later. The power calculator 23 also calculates, in addition to the correlation power value at each sample timing, the correlation power value at the timing one sample back and the correlation power value at the timing one sample later.

Figure 7:
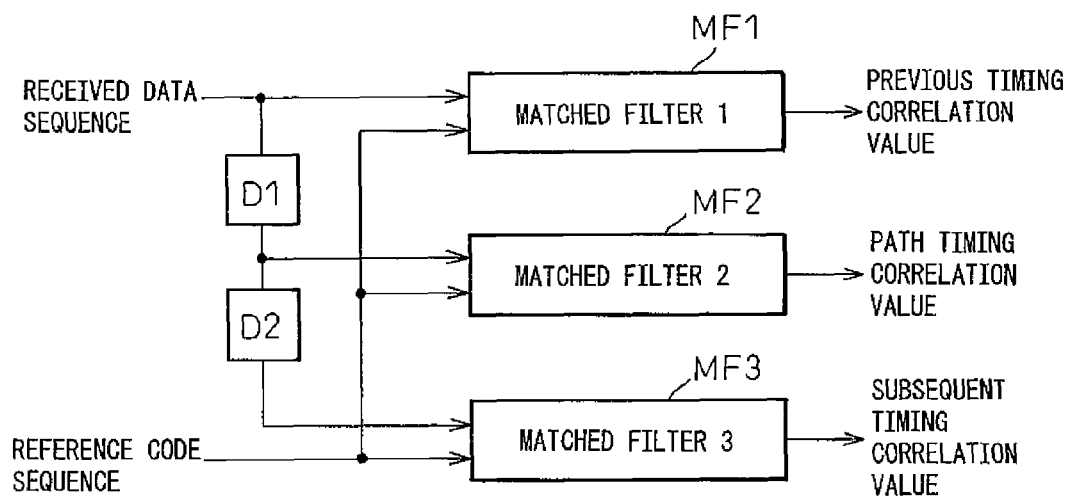
FIG. 7 is a block diagram showing a first configuration example of a correlation calculator shown in FIG. 6.

FIG. 7 is a block diagram showing a first configuration example of the correlation calculator 22 shown in FIG. 6. The correlation calculator 22 includes a delay element D1 for delaying the received data sequence by one sample timing and a delay element D2 for further delaying the thus delayed received data sequence by one sample timing.

It may further include matched filters MF1 to MF3 for calculating the correlation values with respect to the same reference code sequence for the original received data sequence, the received data sequence delayed by one sample timing, and the received data sequence delayed by two sample timings, respectively.

In this way, the correlation value at a given timing, the correlation value at the timing one sample back, and the correlation value at the timing one sample later can be calculated at the same time.

Figure 2:
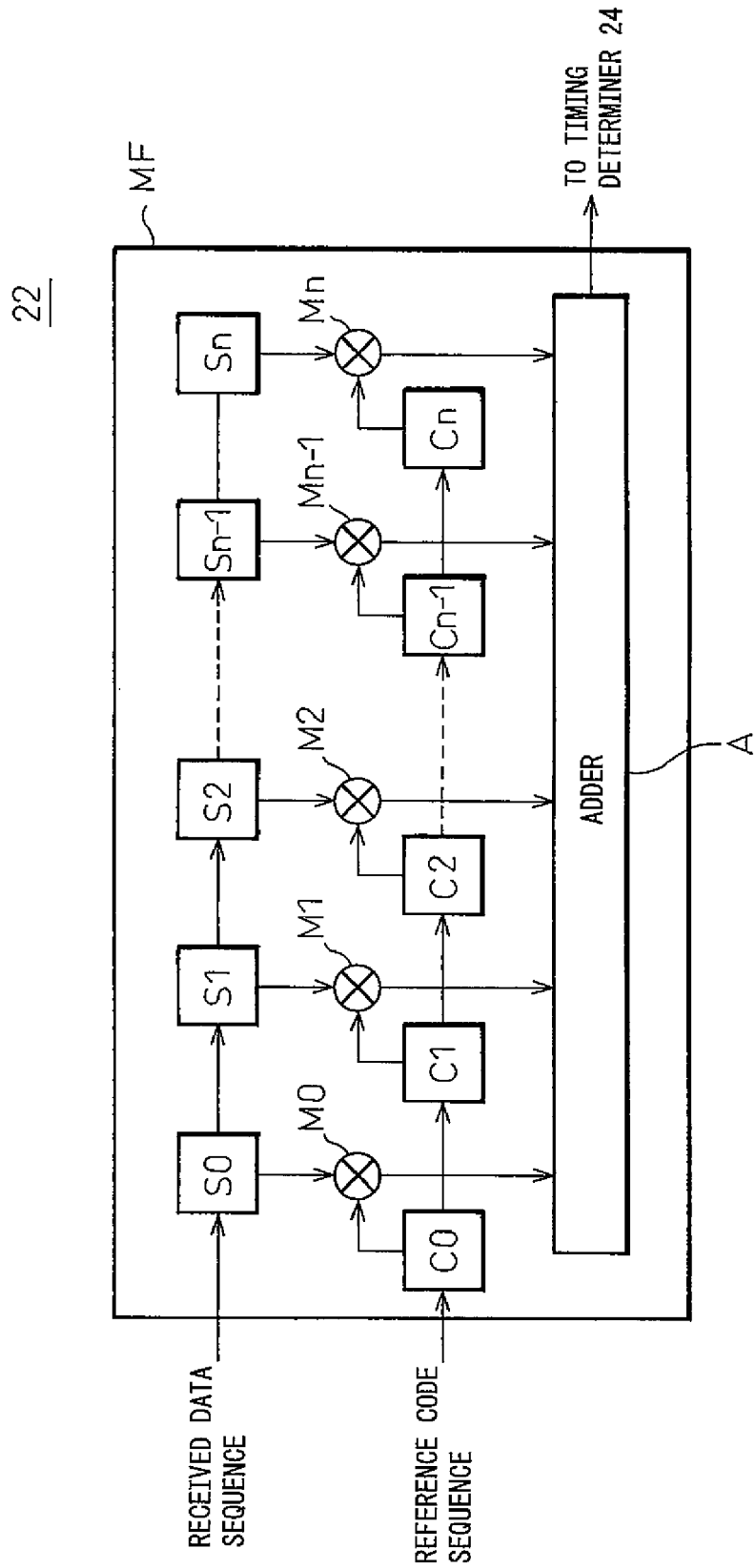
FIG. 2 is a diagram showing a configuration example of a matched filter MF forming a correlation calculator shown in FIG. 1.
Figure 8:
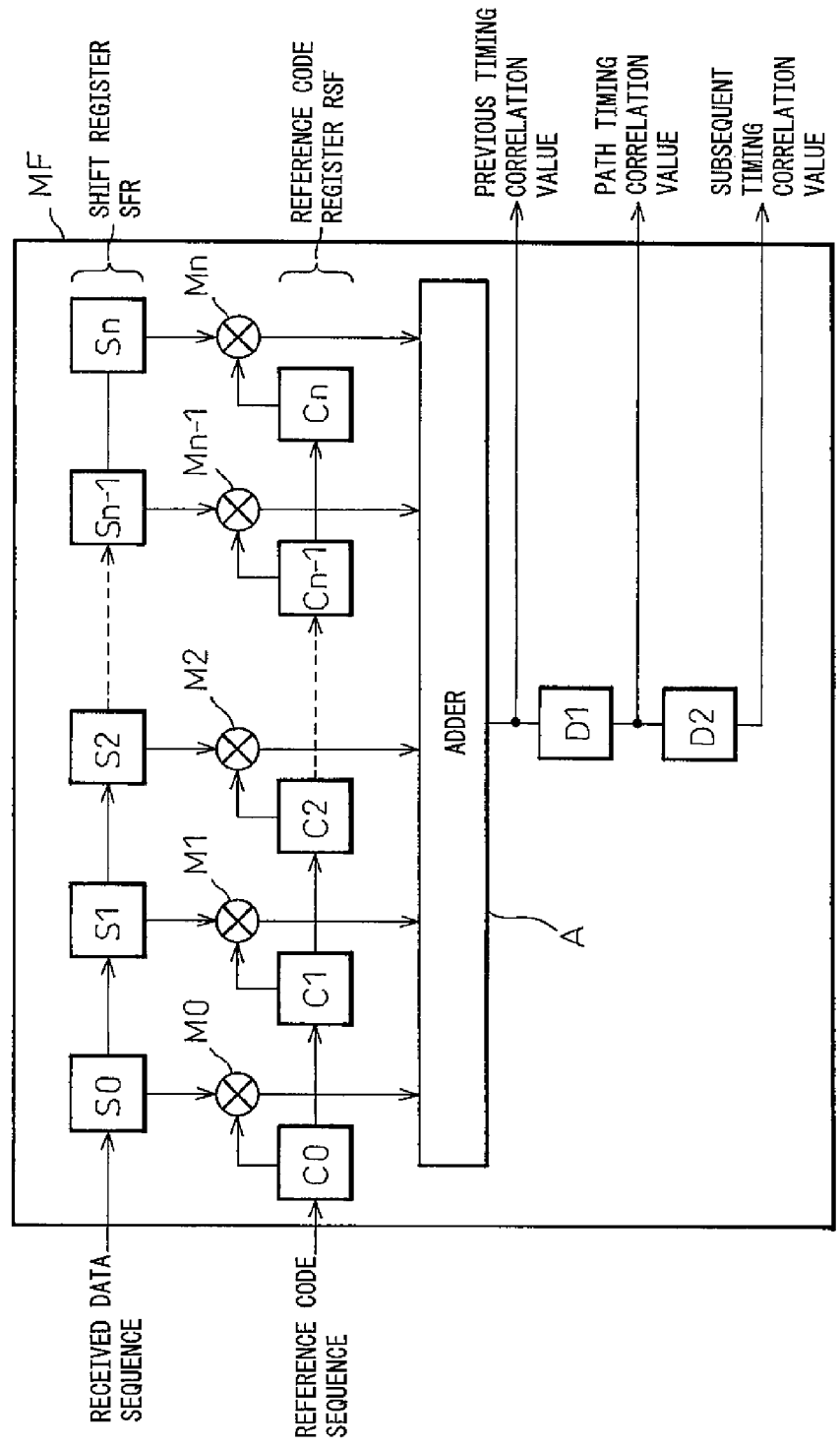
FIG. 8 is a block diagram showing a second configuration example of the correlation calculator shown in FIG. 6.

FIG. 8 is a block diagram showing a second configuration example of the correlation calculator shown in FIG. 6. The correlation calculator includes a delay element D1 for delaying the output of an adder A by one sample timing, the adder A being the same as that included in the matched filter shown in FIG. 2, and a delay element D2 for further delaying the thus delayed output by one sample timing.

Since the adder A outputs the correlation value between the reference code sequence and the received data sequence by sequentially shifting the timing by one sampling period, the correlation value at a given timing, the correlation value at the timing one sample back, and the correlation value at the timing one sample later can be output at the same time by the action of the delay elements D1 and D2.

Turning back to FIG. 6, the correlation power value at each given timing and the correlation power values at the timings before and after it are input to the timing determiner 24, which determines as the path timing the timing where the correlation power value at that given timing is larger than a predetermined threshold value, and takes the correlation power value at that given timing as the path timing correlation power value and the correlation power values at the timings before and after it as the previous timing correlation power value and the subsequent timing correlation power value, respectively. In the following description, the previous timing correlation power value and the subsequent timing correlation power value may be collectively referred to as the "adjacent timing correlation power values."

The timing determiner 24 supplies the path timing to the despreader 31 in a corresponding one of the fingers 30a to 30d, and supplies the path timing correlation power value, the previous timing correlation power value, and the subsequent timing correlation power value to the interpolation adjuster 40.

The interpolation adjuster 40 includes a forward interpolator 62 and backward interpolator 63 for calculating values interpolating between the signal values at respective adjacent sample timings in the received data sequence, i.e., the interpolated values at times intermediate between each sample timing, more specifically, at times displaced by 0.5 sample from each sample timing. The forward interpolator 62 calculates the interpolated received data sequence advanced by 0.5 sample with respect to the received data sequence, while the backward interpolator 63 calculates the interpolated received data sequence delayed by 0.5 sample with respect to the received data sequence.

The interpolators 62 and 63 may each be realized by a digital filter such as a known interpolation filter. In this case, if the number of oversamples of the received data sequence is sufficiently large, the number of taps in the digital filter may be reduced. For example, using a two-tap digital filter, the average value of the received data sampled at two adjacent timings may be taken as the interpolated value between them.

The interpolation adjuster 40 compares the path timing correlation power value with the previous timing correlation power value and the subsequent timing correlation power value. Based on the result of the comparison, the interpolation adjuster 40 controls a selector 61 to select the original received data, the interpolated received data sequence advanced by 0.5 sample with respect to the original received data sequence, or the interpolated received data sequence delayed by 0.5 sample, and supplies the selected data sequence to a corresponding one of the fingers 30a to 30d.

For example, the interpolation adjuster 40 may perform control so that when the difference between the path timing correlation power value and the previous timing correlation power value as one of the adjacent timing correlation power values or their ratio (path timing correlation power value/previous timing correlation power value) becomes smaller than a predetermined threshold value Th1, the interpolated received data sequence advanced by 0.5 sample is supplied via the forward interpolator 62 to a corresponding one of the fingers 30a to 30d.

Or, control may be performed so that when the difference between the path timing correlation power value and the subsequent timing correlation power value as the other one of the adjacent timing correlation power values or their ratio (path timing correlation power value/subsequent timing correlation power value) becomes smaller than the predetermined threshold value Th1, the interpolated received data sequence delayed by 0.5 sample is supplied via the backward interpolator 63 to a corresponding one of the fingers 30a to 30d.

For either adjacent timing correlation power value, if the difference between it and the path timing correlation power value or their ratio (path timing correlation power value/previous or subsequent timing correlation power value) is not smaller than the predetermined threshold value Th1, the original received data sequence may be supplied to a corresponding one of the fingers 30a to 30d.

The threshold value Th1 is determined in advance through experiment or simulation or using a theoretical value. When the discrete path timing determined by the timing determiner 24 is displaced in either the forward or backward direction by 0.25 to 0.5 sample with respect to the optimum path timing corresponding to the actual receive time of the received signal, the interpolated received data sequence displaced by 0.5 sample has a higher correlation with the reference code than the original received data sequence does; on the other hand, when the path timing displacement is smaller than 0.25 sample, the original received data sequence has a higher correlation with the reference code.

Accordingly, for example, to determine the threshold value Th1 with which the difference between the path timing correlation power value and the adjacent timing correlation power value is compared when comparing the path timing correlation power value with the adjacent timing correlation power value, the correlation value is calculated through experiment, etc. by shifting the despreading timing by 0.25 sample with respect to the optimum path timing (i.e., the timing where the correlation value becomes maximum), and the difference between it and the maximum correlation value is taken as the threshold value Th1.

On the other hand, to determine the threshold value Th1 with which the ratio between the path timing correlation power value and the adjacent timing correlation power value is compared, the correlation value is calculated by shifting the despreading timing by 0.25 sample with respect to the optimum path timing, and the ratio between it and the maximum correlation value is taken as the threshold value Th1.

By thus determining the threshold value Th1, despreading is applied to the interpolated received data sequence when the path timing determined by the timing determiner 24 is displaced by 0.25 to 0.5 sample with respect to the optimum path timing. This will be explained with reference to FIG. 9.

Figure 9:
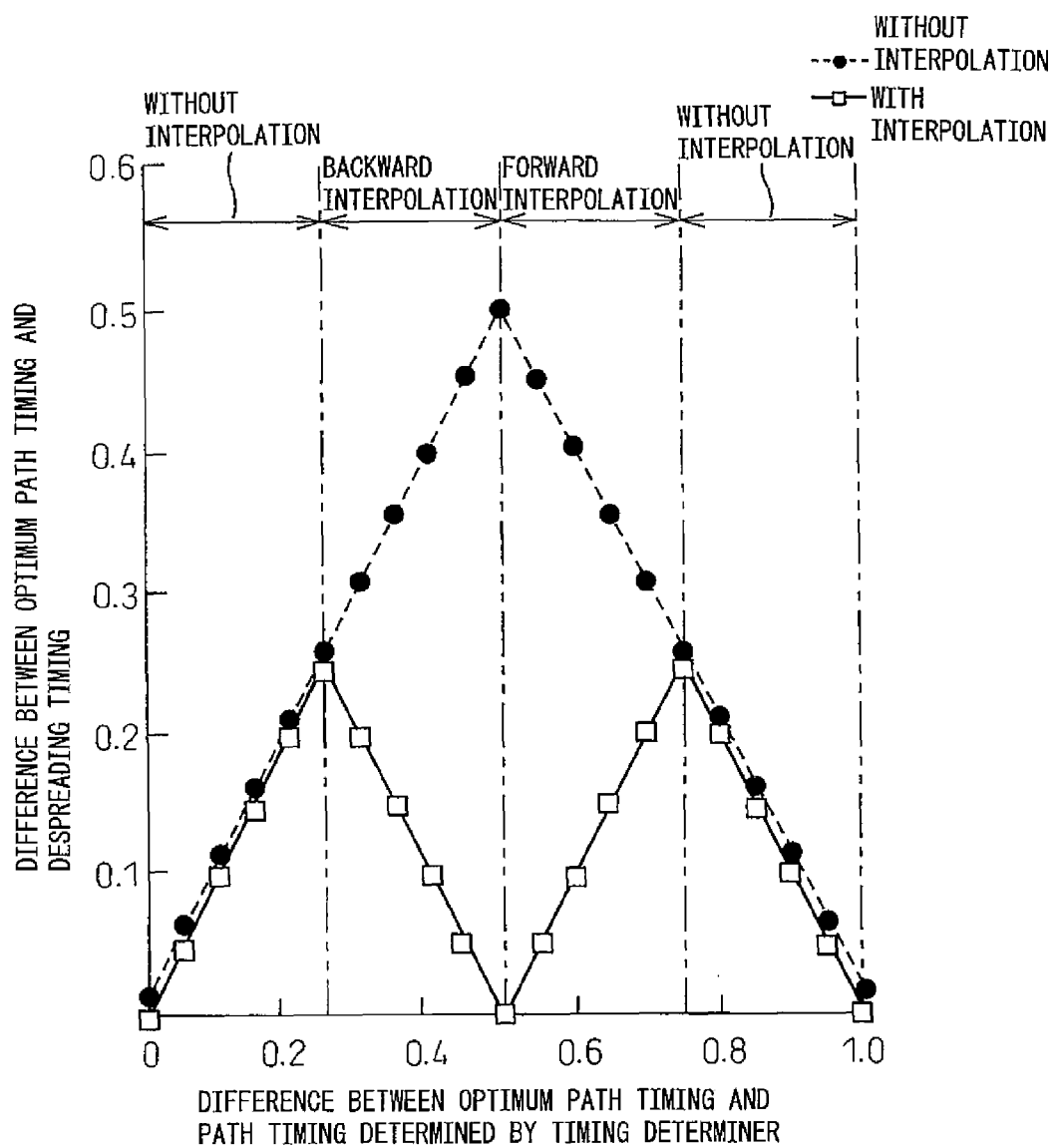
FIG. 9 is a diagram (part 1) showing the difference between despreading timing and optimum path timing in the CDMA receiving apparatus shown in FIG. 6.

In FIG. 9, the abscissa represents the timing difference between the path timing determined by the timing determiner 24 and the optimum path timing, and the ordinate represents the timing difference between the timing for the despreader 31 to despread the incoming data sequence and the optimum path timing.

As shown, when the amount of displacement between the optimum path timing and the path timing determined by the timing determiner 24 is within the range of 0.25 to 0.75 sample, i.e., except when the amount of displacement is 0 to 0.25 sample in the forward or backward direction, the interpolated received data sequence is supplied to the despreader 31; in this case, the difference between the despreading timing and the optimum path timing becomes equal to or less than 0.25 sample, and the difference is thus reduced compared with the case where no interpolation is applied.

The control for switching the input to the despreader 31 between the original received data sequence, the interpolated received data sequence advanced by 0.5 sample, and the interpolated received data sequence delayed by 0.5 sample may be performed only on the correlation power value at the path timing for the maximum path, i.e., the path where the reception strength is the highest, and on its adjacent timing correlation power values. This serves to reduce the amount of circuitry.

Then, the thus selected data sequence may be applied to all the fingers 30a to 30d that perform despreading for the respective path detected on the multipath channel. In this case, for path timings other than the timing for the maximum path, the interpolated timing may be displaced farther away from the actual path timing. The selected data sequence may be applied only to the finger that performs despreading for the maximum path and, for the other paths, despreading may be applied to the original received data sequence.

Figure 10:
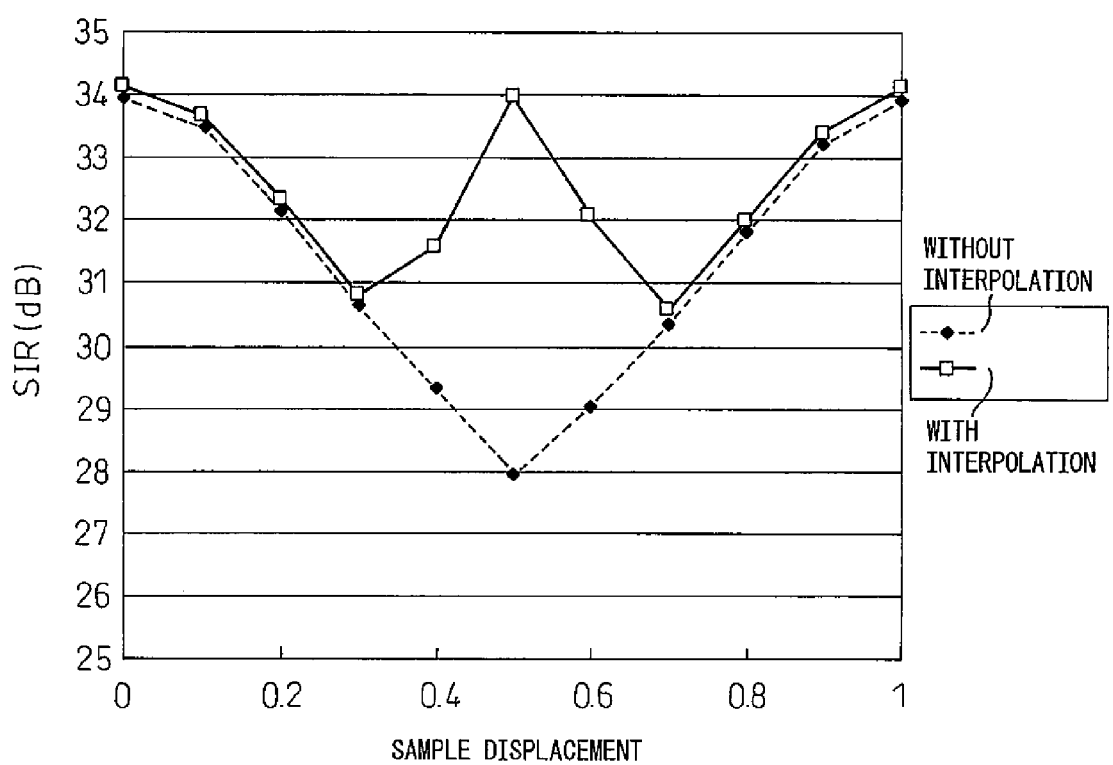
FIG. 10 is a graph of simulation results showing how the reception quality of the CDMA receiving apparatus shown in FIG. 6 has improved.

FIG. 10 is a graph of simulation results showing how the reception quality of the CDMA receiving apparatus shown in FIG. 6 has improved. The graph shows SIR measurement results for CQI in HSDPA, assuming the case where the despreading is performed using data obtained by sampling the received data sequence at a four-times oversampling rate, under reception conditions of Ior/Ioc=30 dB for one static path. It can be seen that a significant improvement is achieved in SIR when the actual path timing lies between the sample timings.

The amount of displacement between the original received data sequence and the interpolated received data sequence that the forward interpolator 62 and the backward interpolator 63 each create need not necessarily be limited to 0.5 sample period, but other sample period (for example, 0.4 sample period) shorter than one sample period may be employed.

Further, the forward interpolator 62 and the backward interpolator 63 may each be configured to be able to generate interpolated received data sequence displaced in time by one of a plurality of periods in a stepwise manner, for example, by 0.5 sample period and 0.25 sample period, with respect to the original received data sequence, based on the result of the comparison between the path timing correlation power value and the adjacent timing correlation power value.

In this case, the threshold value with which the difference or ratio between the path timing correlation power value and the adjacent timing correlation power value is compared when comparing the path timing correlation power value with the adjacent timing correlation power value may also be set to a plurality of values in a stepwise manner.

Then, the forward interpolator 62 and the backward interpolator 63 may generate interpolated received data sequences by displacing the timing in a stepwise manner, depending on which of the stepwise threshold values the difference or ratio between the path timing correlation power value and the adjacent timing correlation power value exceeds.

For example, consider the case where the forward interpolator 62 and the backward interpolator 63 each generate interpolated received data sequences by displacing the timing in two steps, i.e., 0.5 sample period and 0.25 sample period, with respect to the original received data sequence. In this case, the threshold value that the interpolation adjuster 40 uses when comparing the path timing correlation power value with the adjacent timing correlation power value is also set as two different threshold values Th2 and Th3.

To determine such threshold values Th2 and Th3, correlation values are calculated through experiment, etc. by shifting the despreading timing by 0.125 sample and 0.375 sample, respectively, with respect to the optimum path timing, as earlier described, and their differences or ratios with respect to the maximum correlation value are obtained.

Figure 11A:
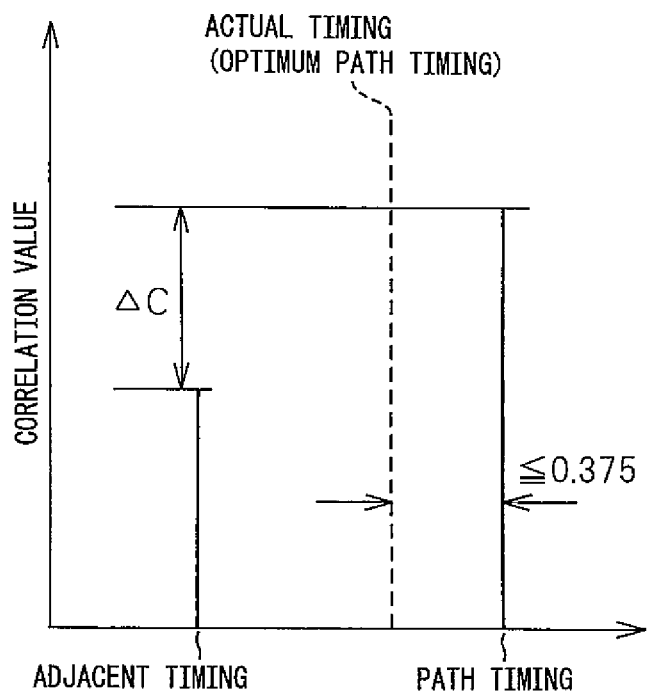
FIG. 11A is diagrams (part 3) explaining the CDMA receiving method disclosed herein.
Figure 11B:
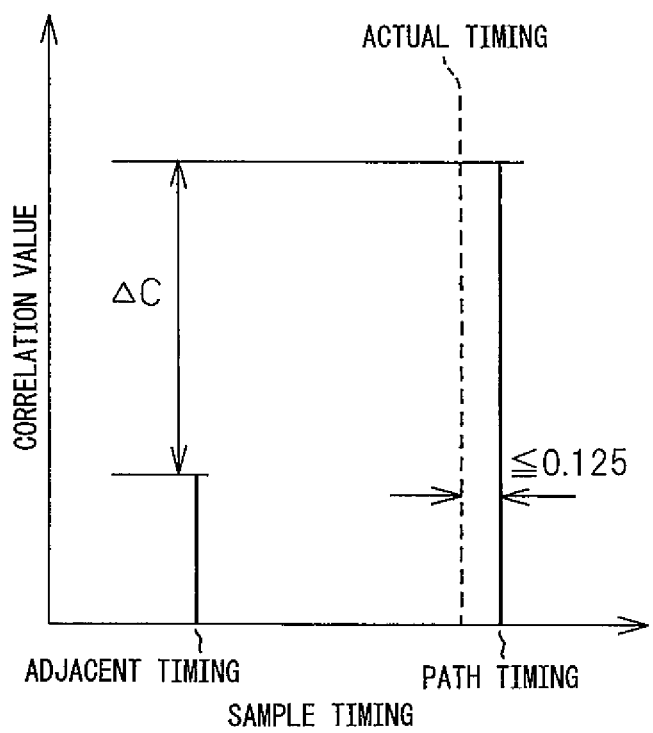
FIG. 11B is diagrams (part 4) explaining the CDMA receiving method disclosed herein.

In this case, as shown in FIGS. 11A and 11B, the difference ΔC between the path timing correlation power value and the adjacent timing correlation power value is larger when the despreading timing is shifted by 0.125 sample period with respect to the optimum path timing than when it is shifted by 0.375 sample period. Accordingly, the relation Th2<Th3 holds between the threshold values Th2 and Th3.

Therefore, when the difference between the path timing correlation power value and the adjacent timing correlation power value or their ratio (path timing correlation power value/adjacent timing correlation power value) is not larger than the predetermined threshold value Th2, the interpolation adjuster 40 may supply the interpolated received data sequence displaced forward or backward by 0.5 sample to a corresponding one of the fingers 30a to 30d via the forward interpolator 62 or the backward interpolator 63.

On the other hand, when the difference between the path timing correlation power value and the adjacent timing correlation power value or their ratio is larger than the predetermined threshold value Th2 but not larger than Th3, the interpolation adjuster 40 may supply the interpolated received data sequence displaced forward or backward by 0.25 sample to a corresponding one of the fingers 30a to 30d via the forward interpolator 62 or the backward interpolator 63.

When the difference between the path timing correlation power value and the adjacent timing correlation power value or their ratio is larger than the predetermined threshold value Th3, the interpolation adjuster 40 may supply the original received data sequence to a corresponding one of the fingers 30a to 30d.

By thus determining the threshold values Th2 and Th3, when the path timing determined by the timing determiner 24 is displaced by 0.125 to 0.375 sample period with respect to the optimum path timing, despreading is applied to the interpolated received data sequence displaced by 0.25 sample, and when the path timing is displaced by 0.375 to 0.5 sample period, despreading is applied to the interpolated received data sequence displaced by 0.5 sample. This will be explained with reference to FIG. 12.

In FIG. 12, the abscissa represents the timing difference between the path timing determined by the timing determiner 24 and the optimum path timing, and the ordinate represents the timing difference between the timing for the despreader 31 to despread the incoming data sequence and the optimum path timing.

Compared with the case where only one kind of interpolated received data sequence (displaced by 0.5 sample) is used (see FIG. 9), when two kinds of interpolated received data sequences (one displaced by 0.25 sample and the other by 0.5 sample) are used, the difference between the despreading timing and the optimum path timing can be reduced to 0.125 sample or less, and thus the despreading timing can be brought closer to the optimum path timing.

The number of steps in which the threshold value and the interpolated received data sequence are displaced is not limited to two but may be increased. By increasing the number of steps, the correction accuracy of the despreading timing can be enhanced.

Figure 13:
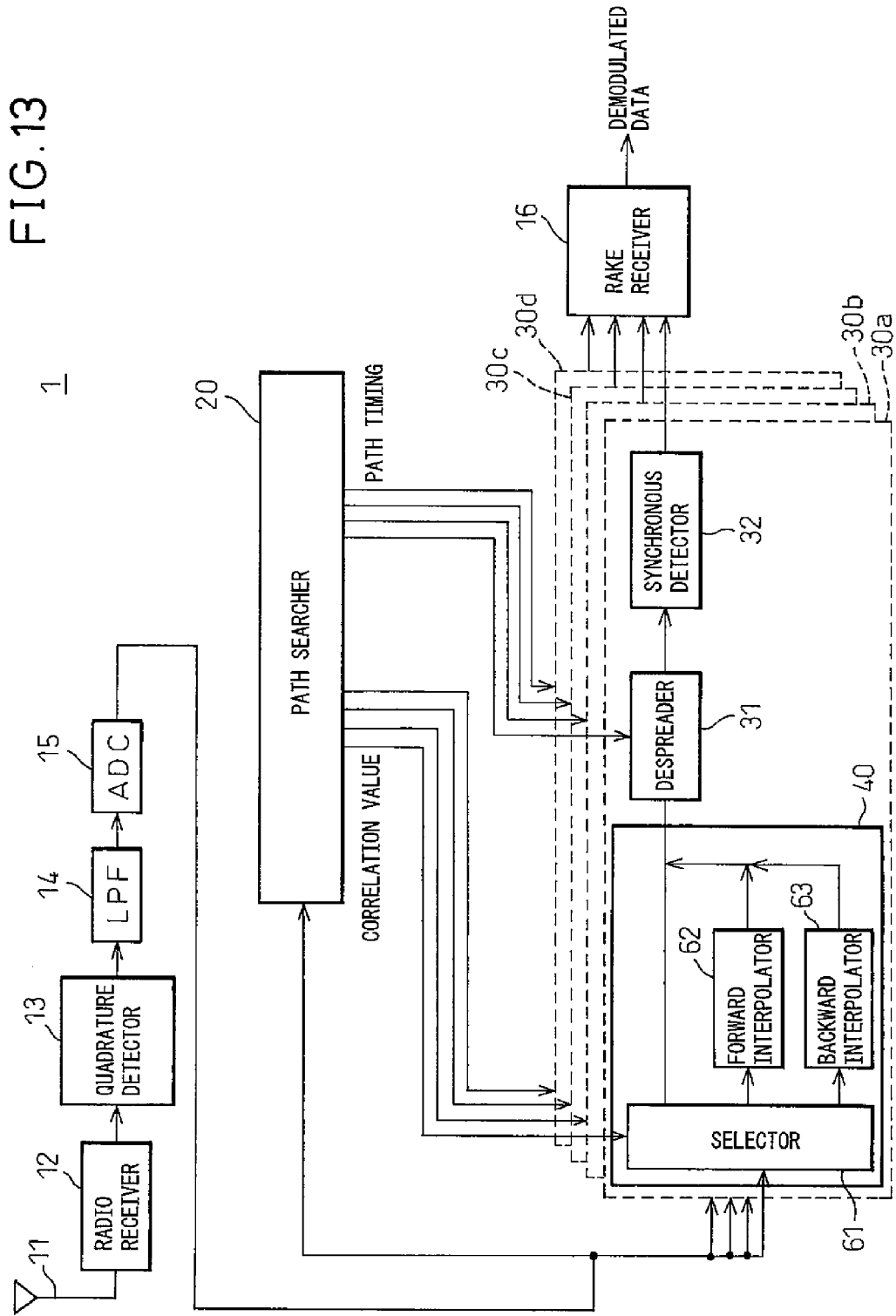
FIG. 13 is a block diagram showing a CDMA receiving apparatus according to a second embodiment.

FIG. 13 is a block diagram schematically showing the configuration of a CDMA receiving apparatus according to a second embodiment. In this embodiment, for every path timing detected on the multipath channel by the path searcher 20, the data sequence to be despread is switched between the original received data sequence and the interpolated received data sequence by using the correlation power values before and after the path search detection timing.

For this purpose, the interpolation adjuster 40 identical to the one shown in FIG. 6 is provided for each of the fingers 30a to 30d. Then, based on the result of the determination made by the interpolation adjuster 40, the data sequence to be despread is selected from among the original received data sequence and the interpolated received data sequences before and after it for each path.

In the figure, the signal line leading from the timing determiner 24 to the interpolation adjuster 40 provided for each of the fingers 30a to 30d is not shown, but the interpolation adjuster 40, like the interpolation adjuster 40 described with reference to FIG. 6, receives the path timing correlation power value, the previous timing correlation power value, and the subsequent timing correlation power value from the timing determiner 24.

In the present embodiment, compared with the embodiment of FIG. 6, the amount of circuitry increases but the characteristics greatly improve.

Figure 14:
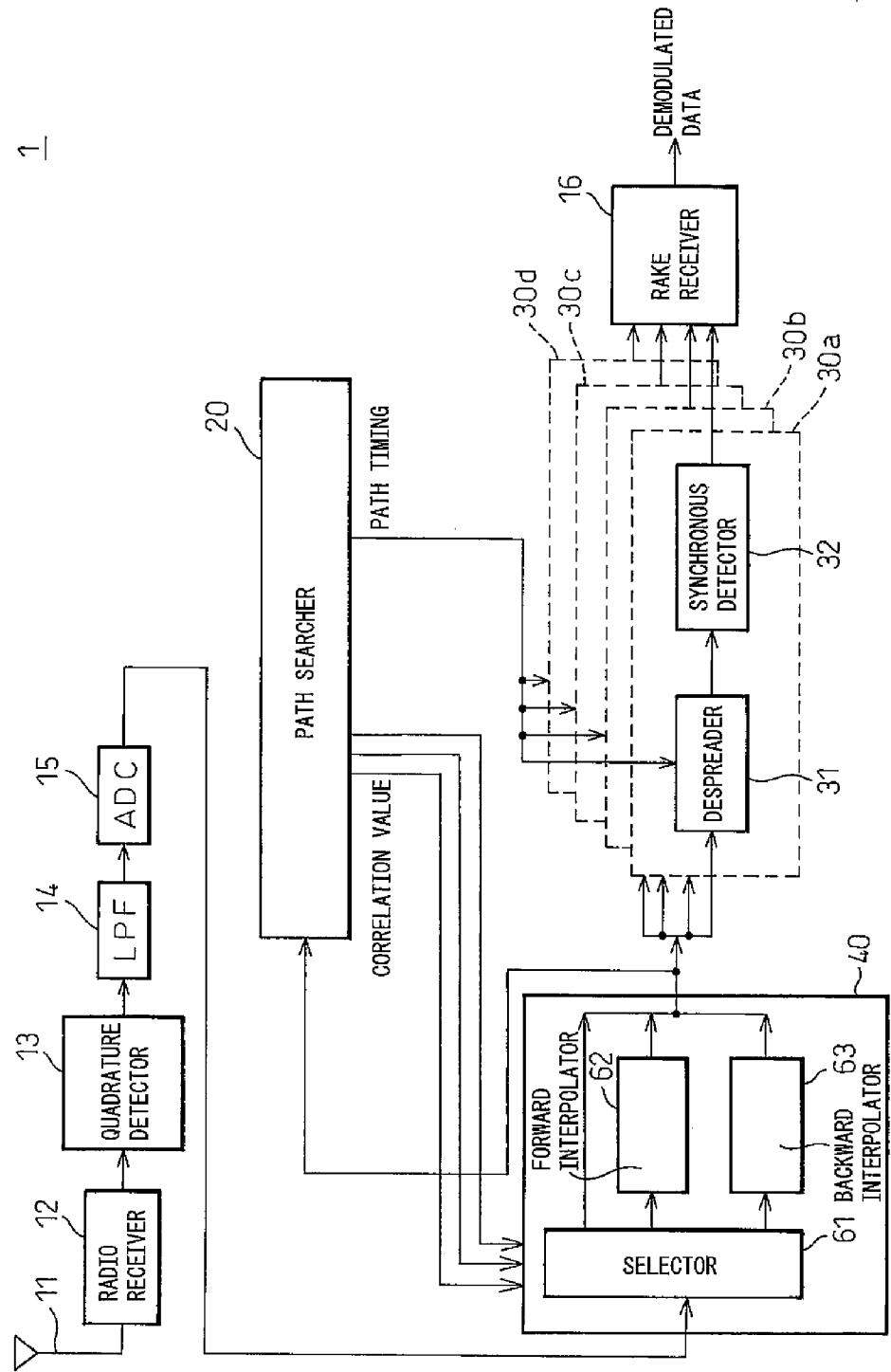
FIG. 14 is a block diagram showing a CDMA receiving apparatus according to a third embodiment.

FIG. 14 is a block diagram schematically showing the configuration of a CDMA receiving apparatus according to a third embodiment. In this embodiment, the data sequence that the selector 61 selected from among the original received data sequence and the interpolated received data sequences before and after it in accordance with the result of the determination made by the interpolation adjuster 40 is fed back to the path searcher 20, and the path search is performed by using the thus fed back data sequence. According to this embodiment, since the path timing can be detected using the interpolated data sequence, the effect is that the peak of the correlation value between it and the reference code sequence can be detected easily.

Figure 15:
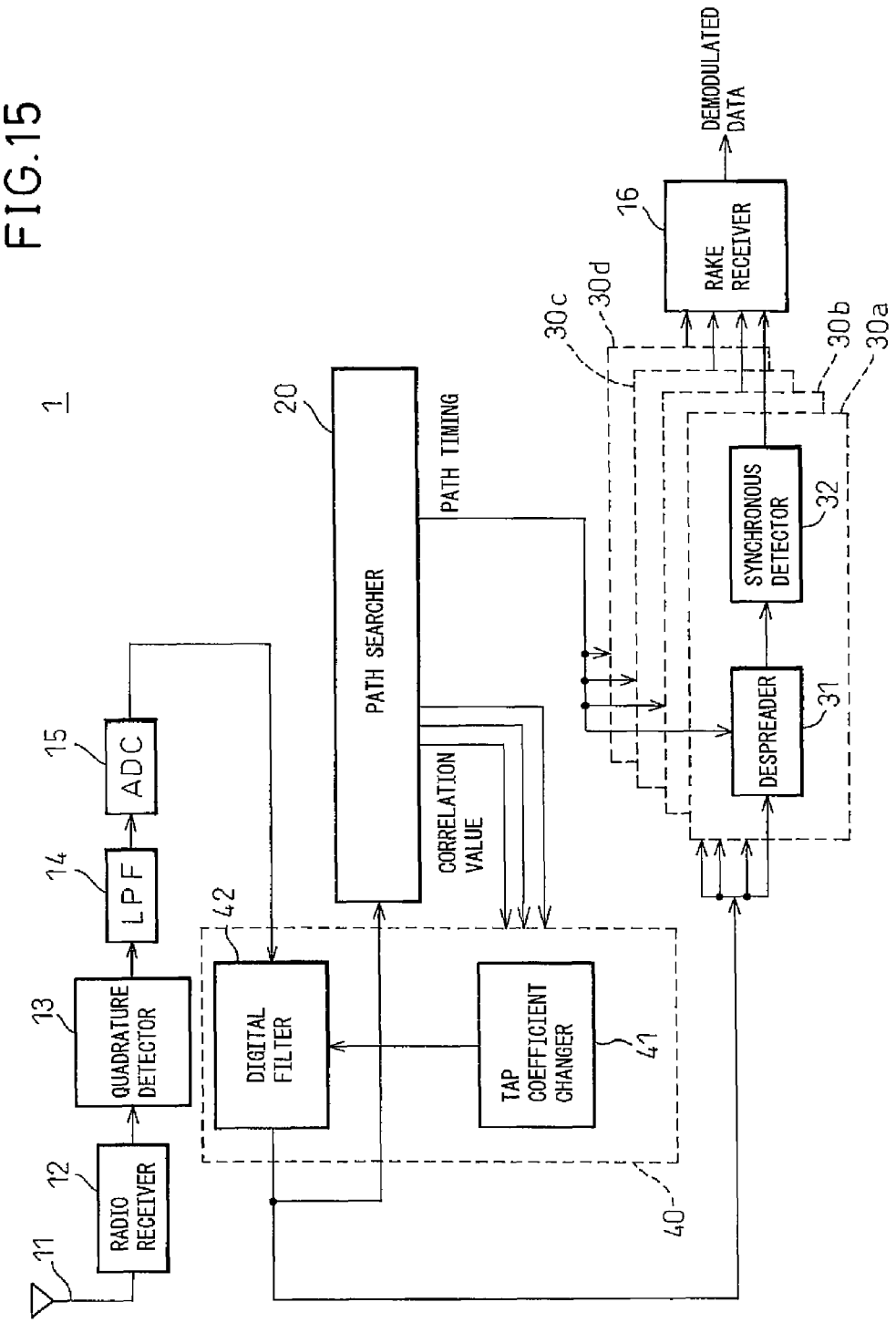
FIG. 15 is a block diagram showing a CDMA receiving apparatus according to a fourth embodiment.

FIG. 15 is a block diagram schematically showing the configuration of a CDMA receiving apparatus according to a fourth embodiment. In this embodiment, the interpolated received data sequence is generated from the received data sequence by using a digital filter 42 that filters the received data sequence. Then, by changing the tap coefficient of the digital filter 42, the data sequence to be output from the digital filter 42 to the fingers 30a to 30d is selected from among the original received data sequence and the interpolated received data sequence generated by shifting the timing forward or backward. For this purpose, the CDMA receiving apparatus 1 includes a tap coefficient changer 41 that changes the tap coefficient in accordance with the result of the determination made by the interpolation adjuster 40. The technique for changing the timing by changing the tap coefficient of the digital filter is known in the art. The CDMA receiving apparatus 1 may be equipped with a band-limiting filter in order to limit the reception bandwidth; in this case, the apparatus disclosed herein can be implemented simply by using such a band-limiting filter as the digital filter 42 of this embodiment.

Figure 16:
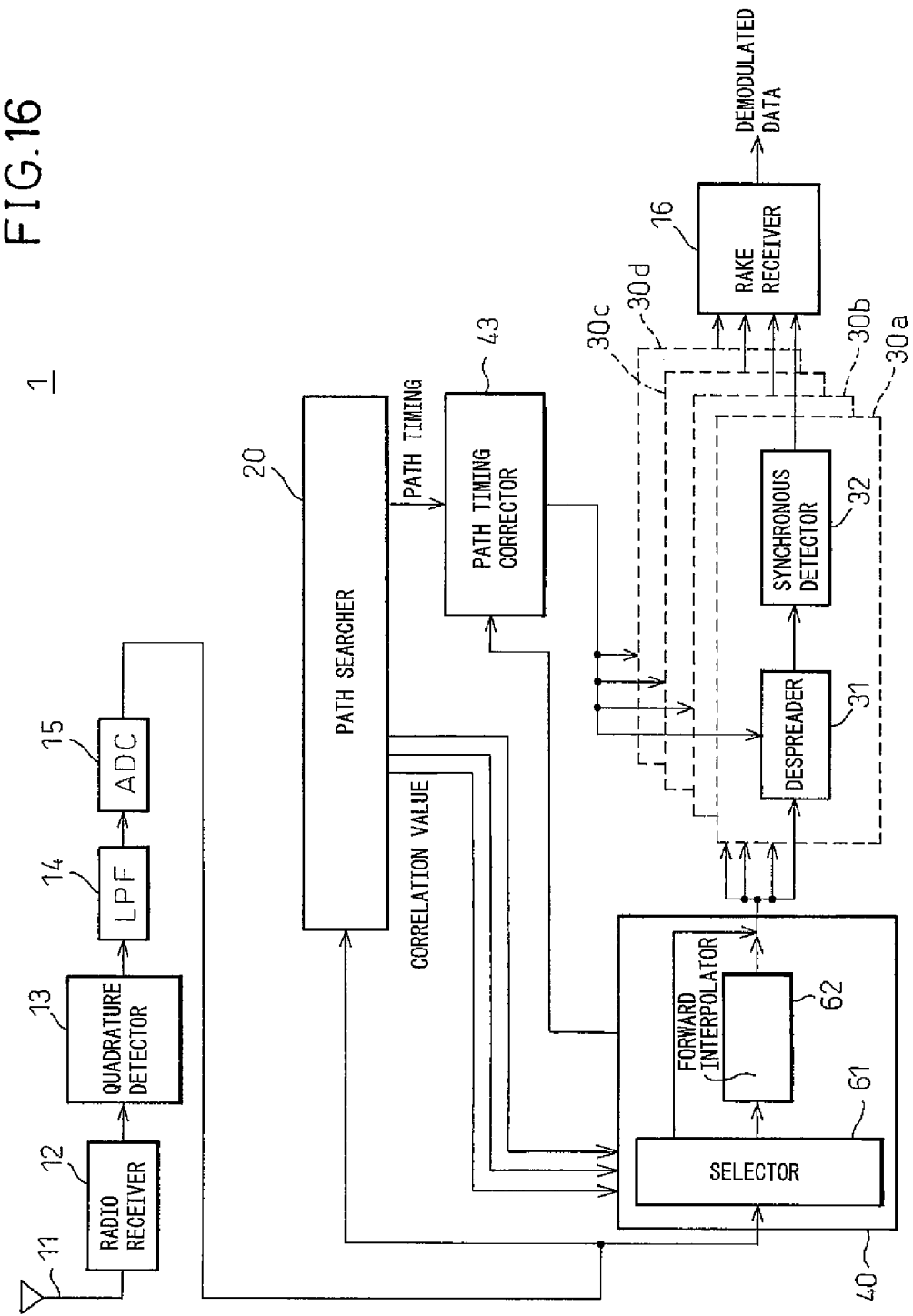
FIG. 16 is a block diagram showing a CDMA receiving apparatus according to a fifth embodiment.

FIG. 16 is a block diagram schematically showing the configuration of a CDMA receiving apparatus according to a fifth embodiment.

In this embodiment, when the input data sequence to the despreader 31 is to be displaced in the forward direction, the interpolation is performed using only the forward interpolator 62; on the other hand, when displacing it in the backward direction, the received data sequence to be input to the despreader 31 is displaced in the forward direction by the forward interpolator 62 by a specified fraction of one sample period and, at the same time, the despreading timing is delayed by one sample period from the timing determined by the path searcher 20.

For this purpose, the CDMA receiving apparatus 1 includes a path timing corrector 43 that corrects the path timing to be supplied to the despreader 31 in accordance with the result of the determination made by the interpolation adjuster 40.

In the configuration of FIG. 6, because of the provision of the two interpolators 62 and 63, the despreading timing at the despreader 31 may vary by 0.5 sample forward and 0.5 sample backward, a total of one sample period, with respect to one path timing detected by the path searcher 20.

As a result, when the despreading timing is (t1+t2)/2 which is midway between sample timings t1 and t2, there arises the possibility that different sample timings t1 and t2 may be supplied from the path searcher 20 for the same path timing; this adds complexity to the timing-related processing (for example, the processing to determine whether the receiving apparatus 1 is receiving signals successively from the same path).

According to the present embodiment, since the width of correction of the despreading timing by the interpolator is reduced to 0.5 sample, there is no possibility of different sample timings being input to the despreader 31 for the same path timing, and this serves to reduce the complexity of the timing-related processing. Furthermore, since the backward interpolator 63 can be omitted, the configuration is advantageous in reducing the amount of circuitry.

As an alternative to the present embodiment, when the backward interpolator is provided for shifting the data sequence by 0.5 sample in the backward direction, and when performing the processing for shifting the data sequence by 0.5 sample in the forward direction, the received data sequence to be input to the despreader 31 is shifted by 0.5 sample in the backward direction by the backward interpolator and, at the same time, the despreading timing is advanced using the path timing corrector 43 by one sample period from the timing determined by the path searcher 20.

In the embodiments shown in FIGS. 13 to 16, the forward interpolator 62 and the backward interpolator 63 may each be configured to generate interpolated received data sequences by displacing the timing in a stepwise manner with respect to the original received data sequence, as earlier described with reference to FIGS. 11 and 12.

According to the apparatus and method disclosed herein, the timing error between the discrete path timing detected by the path searcher 20 and the optimum path timing determined in accordance with the actual receive time is reduced using a simple configuration. As a result, the despreading code sequence can be applied to the received data sequence at a highly accurate timing.

While the present invention has been described with reference to the preferred embodiments selected only for illustrative purposes, it is apparent to those skilled in the art that various modifications, omissions, and departures can be made to these embodiments without departing from the spirit and scope of the present invention. Further, it is to be understood that the terms used in the appended claims are not limited to the specific meanings used in the embodiments described in this specification.

What is claimed is:

1. A CDMA receiving apparatus for demodulating a received signal by applying despreading thereto using a code sequence identical to a spreading code sequence, comprising:
   a path searcher which takes a received data sequence as an input, and which outputs path timing that corresponds to sample timing where a correlation value indicative of correlation between said received data sequence and a reference code sequence reaches a peak, and outputs said correlation value calculated at a sample timing adjacent to said path timing as an adjacent timing correlation value;
   an interpolation adjuster which includes an interpolator for generating an interpolating data sequence which is a data sequence displaced in time by a specified fraction of one sample period with respect to said received data sequence, and which outputs said received data sequence or said interpolating data sequence by switching therebetween based on a result of a comparison between said correlation value calculated at said path timing and said adjacent timing correlation value; and
   a despreader which despreads an output of said interpolation adjuster at said path timing, wherein said interpolation adjuster performs control for switching between said received data sequence and said interpolating data sequence only for a path timing where said path timing correlation value becomes maximum from among a plurality of path timings detected on a multipath channel by said path searcher.

2. A CDMA receiving apparatus as claimed in claim 1, wherein the data sequence selected and output by said interpolation adjuster is fed back to said path searcher, and
   said path searcher determines said path timing by using said fed back data sequence as said received data sequence.

3. A CDMA receiving apparatus as claimed in claim 1, wherein said path searcher determines said path timing based on an original version of said received data sequence.

4. A CDMA receiving apparatus as claimed in claim 1, wherein said receiving apparatus includes a digital filter as said interpolator.

5. A CDMA receiving apparatus as claimed in claim 1, wherein said receiving apparatus includes
   a digital filter as said interpolator, and
   a tap coefficient changer which performs control for switching between said received data sequence and said interpolating data sequence by changing a tap coefficient for said digital filter.

6. A CDMA receiving apparatus as claimed in claim 1, further comprising a path timing corrector which outputs said path timing to said despreader after shifting said path timing in a direction opposite to the direction in which said received data sequence was shifted to generate said interpolating data sequence.

7. A CDMA receiving method for demodulating a received signal by applying despreading thereto using a code sequence identical to a spreading code sequence, comprising:
   outputting path timing that corresponds to sample timing where a correlation value indicative of correlation between a received data sequence and a reference code sequence reaches a peak, and outputting said correlation value calculated at a sample timing adjacent to said path timing as an adjacent timing correlation value;
   generating an interpolating data sequence which is a data sequence displaced in time by a specified fraction of one sample period with respect to said received data sequence, and for outputting said received data sequence or said interpolating data sequence by switching therebetween based on a result of a comparison between said correlation value calculated at said path timing and said adjacent timing correlation value; and
   despreading the output data sequence at said path timing, wherein generating the interpolating data sequence and outputting said received data sequence or said interpolating data sequence are carried out only for a path timing where said path timing correlation value becomes maximum from among a plurality of path timings detected on a multipath channel.

8. A CDMA receiving method as claimed in claim 7, wherein the output data sequence is fed back, and said path timing is determined by using said fed back data sequence as said received data sequence.

9. A CDMA receiving method as claimed in claim 7, wherein said path timing is determined based on an original version of said received data sequence.

10. A CDMA receiving method as claimed in claim 7, wherein said interpolating data sequence is generated by using a digital filter and calculating a value interpolating between each value of said received data sequence.

11. A CDMA receiving method as claimed in claim 7, wherein said interpolating data sequence is generated by using a digital filter and calculating a value interpolating between each value of said received data sequence, and
   control for switching between said received data sequence and said interpolating data sequence is performed by changing a tap coefficient for said digital filter.

12. A CDMA receiving method as claimed in claim 7, wherein said despreading is applied by shifting said path timing in a direction opposite to the direction in which said received data sequence was shifted to generate said interpolating data sequence.

* * * * *